United States Patent [19]

Novotny et al.

[11] 4,223,001
[45] * Sep. 16, 1980

[54] PRODUCTION OF HYDROGEN FROM CARBON MONOXIDE AND WATER

[75] Inventors: Miroslav Novotny, Randolph; Lowell R. Anderson, Morristown, both of N.J.

[73] Assignee: Allied Chemical Corporation, Morris Township, N.J.

[*] Notice: The portion of the term of this patent subsequent to Nov. 21, 1995, has been disclaimed.

[21] Appl. No.: 917,219

[22] Filed: Jun. 20, 1978

[51] Int. Cl.$^2$ ............................................... C01B 1/02
[52] U.S. Cl. ..................................... 423/655; 252/373
[58] Field of Search ................ 423/655, 656; 252/373, 252/428, 429 R, 441, 443

[56] References Cited

U.S. PATENT DOCUMENTS

| | | | |
|---|---|---|---|
| 3,490,872 | 1/1970 | Fenton | 423/656 |
| 3,539,298 | 11/1970 | Fenton | 423/655 |
| 4,054,644 | 10/1977 | Segura et al. | 423/655 |
| 4,126,752 | 11/1978 | Novotny et al. | 568/902 |

FOREIGN PATENT DOCUMENTS 733792  7/1955  United Kingdom .

OTHER PUBLICATIONS

"Research" Chemical Week, Apr. 19, 1978, pp. 63–64.
Cheng et al. "J. Am. Chem. Soc." 99 (8), 1977, pp. 2791–2792.
"Proceedings of the Symposium on Chemicals and Oil From Coal" Jun. 1972, pp. 151–158.
Laine et al. "J. Am. Chem. Soc." 99 (1), 1977, pp. 252–253.

Primary Examiner—Edward J. Meros
Attorney, Agent, or Firm—Robert A. Harman

[57] ABSTRACT

An improved process is described for producing hydrogen from carbon monoxide and water in which carbon monoxide is contacted under homogeneous conditions with an alkaline aqueous liquid phase containing a soluble rhodium-containing catalyst at a reaction temperature from about 100° to 300° C. and at a reaction pressure from about 1 to 300 atmospheres in the presence of a saturated paraffinic water-soluble alcohol.

5 Claims, No Drawings

PRODUCTION OF HYDROGEN FROM CARBON MONOXIDE AND WATER

BACKGROUND OF THE INVENTION

1. Field of the Invention

This invention relates to an improved process for producing hydrogen by contacting carbon monoxide under homogeneous conditions with an aqueous alkaline liquid medium containing a saturated paraffinic water-soluble alcohol and rhodium-containing catalyst.

2. Background of the Invention

The water gas shift reaction, referred to in the art as the "shift reaction", i.e., $$CO + H_2O \rightleftharpoons CO_2 + H_2$$

is well known and has been of great industrial importance for over 40 years. The reaction finds application, for example: in the large scale production of hydrogen for ammonia synthesis; in increasing the hydrogen to carbon monoxide ratio for methanation and in Fischer-Tropsch synthesis; in the treatment of combustion exhaust gases through carbon monoxide removal, and hydrogen generation for reducing nitrogen and sulfur oxides.

Heterogeneous catalysts are usually employed in the shift reaction and are either iron oxide and related oxides in which the process must be conducted at temperatures exceeding 350° C., or copper metal, in which the process is conducted in the temperature range of about 200° to 250° C. However, at these required high temperatures, the equilibrium constant of the shift reaction becomes significantly smaller with increasing temperature.

Thus, a constant area of activity in this field revolves around the search for new improved conditions for conducting the shift reaction at lower temperatures and under more favorable equilibrium conditions.

Homogeneous catalysts, based on Group VIII metals, for conducting the shift reaction under more desirable low temperature conditions, are known and are described in *J. Am. Chem. Soc.* 99(8) pp 2792-3 (1977); *J. Am. Chem. Soc.*, 99(1) pp. 252-3 (1977); U.S. Pat. No. 3,539,298 (1970); U.S. Pat. No. 3,490,872 (1970), and Japanese Patent Application No. 52056094. However, none of the references mention the use of a saturated paraffinic water-soluble alcohol as a catalytic reagent to increase the yield and rate of production of hydrogen at desired low temperatures in a homogeneous-process utilizing an aqueous alkaline liquid phase and a rhodium-containing catalyst.

SUMMARY OF THE INVENTION

We have unexpectedly discovered that the shift reaction can be carried out quite effectively at low temperatures under alkaline conditions homogeneously by employing a saturated paraffinic water-soluble alcohol and rhodium-containing catalyst.

In accordance with this invention, there is provided in a process for producing hydrogen and carbon dioxide, including contacting carbon monoxide under homogeneous conditions with an alkaline aqueous liquid phase, containing a soluble Group VIII metal catalyst, at a reaction temperature from about 100° to 300° C. and at a reaction pressure from about 1 to 300 atmospheres, the improvement which comprises conducting the process in the presence of a saturated paraffinic water-soluble alcohol and said catalyst containing rhodium and being soluble in the reaction medium. By the term "liquid phase" is meant a homogeneous liquid medium under the reaction conditions of temperature and pressure.

DESCRIPTION OF THE INVENTION AND PREFERRED EMBODIMENTS

The novelty of this invention resides in the discovery that conducting the water gas shift reaction under alkaline homogeneous conditions in the presence of a saturated paraffinic water-soluble alcohol and rhodium-containing catalyst unexpectedly increases the yield of desired hydrogen under relatively moderate reaction conditions. Thus, the relatively high temperatures which are required where the shift reaction is carried out in the presence of an inorganic basic reagent alone, as practiced in the above-described prior art of U.S. Pat. No. 3,490,872, can be avoided. The reason as to why in the presence of said alcohol, rhodium-containing catalyst is effective in producing high percent yields of hydrogen is not clearly understood, but may be due to the fact that under basic conditions said alcohol can be readily carbonylated to its formate ester. Hydrolysis of the formate ester could then yield formic acid and the initial alcohol. Formic acid could then be decomposed to hydrogen and carbon monoxide by the rhodium-containing catalyst.

In general, the process involves the use of a saturated paraffinic water-soluble alcohol which exerts a catalytic affect on the production of hydrogen in the reaction and must also be soluble in the alkaline aqueous liquid phase. Representative examples include methanol, ethanol, isopropanol, propanol, ethylene glycol, ethoxyethanol, methoxyethanol, 1,2- and 1,3-propylene glycol, and glycerol. Preferred alcohols in the process are methanol and ethylene glycol.

The amount of alcohol used in the process is preferably about 0.1 to 10 parts by weight of alcohol per part of alkaline aqueous liquid phase and preferably about 0.5 to 1.5 parts by weight of alcohol per part of said liquid phase.

Rhodium-containing catalyst useful in the invention process should be effective in promoting the water gas shift reaction and should be soluble in the reaction medium of the alkaline aqueous liquid phase containing said alcohol. The rhodium-containing catalyst can be rhodium salts, inorganic or organic rhodium complexes. Representative examples include rhodium chloride, rhodium carbonyl chloride and rhodium carbonyl iodide. Preferred rhodium catalyst is rhodium chloride, $RhCl_3$, including its hydrated forms such as the trihydrate.

The amount of rhodium-containing catalyst used in the invention process is generally about 0.0001 to 0.1 part by weight catalyst per part of alkaline aqueous liquid phase and preferably about 0.002 to 0.02 part by weight of catalyst per part of said liquid phase. The amount of carbon monoxide used in relation to the alkaline liquid phase is known in the art and described in U.S. Pat. No. 3,539,298 and U.S. Pat. No. 3,490,872 which are hereby incorporated by reference. In general, an amount of carbon monoxide of about 5 to 1 parts by weight per part of alkaline aqueous liquid phase is used. Technical, industrial or reagent grades of carbon monoxide are equally effective in the invention process.

The amount of water used in the invention process to form the aqueous liquid phase is well known in the art as described in the above incorporated references and is dependent upon the batch size of the reaction and the size of the apparatus. The amount of water used serves as the basis for the proportions of all other materials used in the process.

The alkalinity of the aqueous liquid phase is achieved by the use of an alkaline inorganic reagent. Representative examples are adequately described in the above incorporated references and include alkali metal hydroxide, alkali metal carbonates, alkali metal bicarbonates, alkali metal acetates and formates, ammonium hydroxide and quaternary ammonium halides. Illustrative examples are sodium hydroxide, potassium hydroxide, sodium bicarbonate, sodium acetate, sodium formate, tetrabutyl ammonium chloride, sodium carbonate, potassium carbonate and the like. Preferred reagents for achieving alkalinity in the aqueous liquid phase are alkali metal carbonates, particularly sodium and potassium carbonates.

Amount of alkaline reagent used must be sufficient to achieve a pH of at least about 7 in the alkaline aqueous liquid phase and preferably a pH in the range of about 10 to 14.

Temperature in the invention process is usually conducted in the range of about 100° to 300° C., and preferably in the range of about 175° to 260° C. Pressure in the invention process is usually about 1 to 300 atmospheres and preferably about 150 to 200 atmospheres.

The invention process can be conducted in a continuous or static manner.

A static process is generally conducted by initially adding an alcohol useful in the invention, rhodium-containing catalyst, water and an alkaline reagent to a suitable pressure reaction vessel. The reactor used is preferably constructed of corrosion and pressure resistant type of material such as stainless steel. The reaction mixture is then "degassed" or flushed to remove air and residual amounts of oxygen. Carbon monoxide is then introduced into the vessel, usually under pressure and the reaction contents are shaken or rocked to agitate the reaction mixture while the internal temperature is increased to the desired value. An internal pressure of about 250 to 300 atmospheres will develop at the desired temperature. The reaction time will depend primarily on the size of the total charge, the apparatus, the reaction temperature and pressure. Generally times of about 1 to 4 hours are required to obtain significant conversion of water to hydrogen gas useful in the process. At the end of the reaction period, the product hydrogen and carbon dioxide are collected and analyzed by known methods such as gas chromatography and can be subsequently used for other desired processes such as methanation or reduction.

A continuous process involves for example, feeding a stream of carbon monoxide, water, alkaline reagent and alcohol over a rhodium-containing catalyst bed. Conventional types of process apparatus can be used in the process such as fixed bed, moving bed, fluidized bed, countercurrent stream types, all well known in the art.

The percent conversion of water, defined as 100× (moles water, reached during the process divided by moles water introduced at beginning of reaction process) is a measure of the efficiency of the process for the production of hydrogen and is generally about 25 to 75%.

The efficiency of the reaction process can also be expressed as 100× (moles of hydrogen produced per mole of water introduced in the reaction) and is usually about 20 to 70%.

Best mode in the invention process as contemplated by us involves a static process wherein water, sodium carbonate, rhodium chloride and ethylene glycol are placed into a stainless steel pressure vessel. The residual air is flushed out with nitrogen and carbon monoxide and an atmosphere of carbon monoxide at a pressure of about 2600 psi gauge is thereby obtained. The reaction contents are heated and agitated for about 4 hours at a temperature of about 200° to 260° C. resulting in a percent conversion of water to hydrogen of about 15 to 75%.

The following examples are illustrative of the invention as contemplated by us and should not be considered to be limitations on the scope or spirit of the instant invention.

COMPARATIVE EXAMPLE

Into a 183 ml and stainless steel rocking reactor were charged 15.0 gm of $H_2O$, and 3.0 gm of sodium carbonate. After flushing the reactor several times with nitrogen and carbon monoxide, the reactor was pressurized with 2600 psi of carbon monoxide (Matheson Gas Products) and then heated at a given temperature (listed in Table I) and kept sufficiently agitated by rocking at that temperature for about four hours. After cooling the reactor, the gaseous and liquid samples were withdrawn and analyzed by gas chromatography versus known standards. The results are presented below in Table I.

TABLE I

| t [°C.] | $H_2$ [%][b] | $H_2$ Moles | CO [%][b] | CO Moles | $c_{H_2O}$[a] [%] |
|---|---|---|---|---|---|
| 240 | 12 | 0.15 | 77 | 1.01 | 19 |
| 250 | 16 | 0.21 | 72 | 0.93 | 23 |
| 265 | 28 | 0.37 | 50 | 0.67 | 51 |
| 280 | 31 | 0.41 | 43 | 0.61 | 58 |

[a]Conversion of water,
$$c_{H_2O} = 100 \times \frac{n_o - n_f}{n_o},$$
wherein $n_o$ is number of moles of $H_2O$ at the beginning of the reaction and $n_f$ is number of moles of $H_2O$ at the end of the reaction.
[b]Molar volume percent.

EXAMPLE 1

The procedure of the above Comparative Example was repeated with the exception that 13.0 gm of methanol and 0.1 gm of $RhCl_3.3H_2O$ were charged into the reactor together with 15.0 gm of water and 3.0 gm of sodium carbonate. The results are presented below in Table II.

TABLE II

| t [°C.] | $H_2$ [%][b] | $H_2$ Moles | CO [%][b] | CO Moles | $c_{H_2O}$[a] [%] |
|---|---|---|---|---|---|
| 150 | 16 | 0.19 | 71 | 0.85 | 26 |
| 175 | 22 | 0.27 | 59 | 0.73 | 37 |
| 200 | 31 | 0.40 | 44 | 0.55 | 56 |
| 249 | 32 | 0.41 | 44 | 0.55 | 56 |

[a],[b]Same as defined in Table I.

EXAMPLE 2

The procedure of the above Comparative Example was repeated except that 13.8 g of ethylene glycol and 0.1 g $RhCl_3.3H_2O$ were charged into the reactor together with 15 g of distilled water and 3.0 g of sodium carbonate. The results are presented below in Table III.

TABLE III

| t [°C.] | $H_2$ [%][b] | $H_2$ Moles | CO [%][b] | CO Moles | $c_{H_2O}{}^a$ [%] |
|---|---|---|---|---|---|
| 200 | 12 | 0.14 | 77 | 0.88 | 15 |
| 220 | 23 | 0.26 | 56 | 0.64 | 35 |
| 240 | 34 | 0.41 | 37 | 0.44 | 57 |
| 260 | 41 | 0.51 | 23 | 0.28 | 73 |

[a,b]Same as defined in Table I.

We claim:

1. In a process for producing hydrogen and carbon dioxide including contacting carbon monoxide under homogeneous conditions with an alkaline aqueous liquid phase, containing a soluble Group VIII metal catalyst, at a reaction temperature from about 100° to 300° C. and at a reaction pressure from about 1 to 300 atmospheres, the improvement which comprises conducting the process in the presence of a saturated paraffinic water-soluble alcohol and said metal catalyst consisting essentially of a rhodium compound selected from the group consisting of rhodium chloride, rhodium carbonyl chloride and chodium carbonyl iodide, and being soluble in the reaction medium.

2. The process of claim 1 wherein said alcohol is methanol, ethanol, propanol, isopropanol, ethylene glycol, ethoxyethanol, methoxyethanol, 1,2- or 1,3-propylene glycol or glycerol.

3. The process of claim 1 wherein said alcohol is present in an amount of about 0.1 to 10 parts by weight per part of said aqueous liquid phase.

4. The process of claim 1 wherein said reaction temperature is about 175° to 260° C.

5. The process of claim 1 wherein said catalyst is rhodium trichloride, or hydrated form thereof.

* * * * *